United States Patent

Nagl et al.

[11] Patent Number: 6,083,472
[45] Date of Patent: Jul. 4, 2000

[54] METHOD FOR CONTINUOUSLY PRODUCING THIOSULFATE IONS

[75] Inventors: Gary J. Nagl, Deer Park; Myron Reicher, Arlington Heights; Derek McManus, Roselle; Barry Ferm, Naperville, all of Ill.

[73] Assignee: U.S. Filter/Gas Technology Products, Schaumburg, Ill.

[21] Appl. No.: 09/239,472

[22] Filed: Jan. 28, 1999

[51] Int. Cl.$^7$ .......................... B01D 53/52; C01B 17/04
[52] U.S. Cl. ................................ 423/573.1; 423/576.5; 423/576.6; 423/224; 423/234
[58] Field of Search ............................ 423/576.5, 576.6, 423/224, 232, 234, 573.1

[56] References Cited

U.S. PATENT DOCUMENTS

| 1,792,097 | 2/1931 | Jacobson | 423/576.5 |
| 4,118,467 | 10/1978 | Sano et al. | 423/573 R |
| 4,622,212 | 11/1986 | McManus et al. | 423/226 |
| 4,859,436 | 8/1989 | Olson et al. | 423/221 |

FOREIGN PATENT DOCUMENTS

| 0 152 647 A1 | 8/1985 | European Pat. Off. |
| 0 279 667 A2 | 8/1988 | European Pat. Off. |
| WO 96/14921 | 5/1996 | WIPO |

OTHER PUBLICATIONS

Kohl et al. "Gas Purification" 4th Edition, Gulf Publishing Co., Houston TX USA, ISBN 0-87201-314-6, pp. 486–488, 1985.

Primary Examiner—Steven P. Griffin
Assistant Examiner—Timothy C Vanoy
Attorney, Agent, or Firm—McDonnell Boehnen Hulbert & Berghoff

[57] ABSTRACT

A process is provided for the removal of hydrogen sulfide out of a gas stream by contacting the hydrogen sulfide contaminated gas with a solution of chelated metal catalyst, such as iron EDTA, in a scrubbing vessel so as to result in a cleaned gas and a scrubbing solution containing elemental sulfur and a reduced chelated metal catalyst. A portion of the hydrogen sulfide contaminated feed gas is branched off from the rest of the hydrogen sulfide contaminated feed gas, at a location upstream of the scrubbing vessel, and injected into a bisulfide generating vessel where it is contacted with an aqueous caustic solution, such as an aqueous solution of potassium hydroxide, wherein the hydrogen sulfide reacts with the caustic solution to result in a cleaned gas and a solution containing bisulfide ions. The solution containing bisulfide ions and the scrubbing solution containing elemental sulfur and reduced chelated metal catalyst are both injected into an oxidation vessel where they are contacted with an oxygen containing gas which oxidizes the reduced chelated metal catalyst back into its reactive oxidation state and also oxidizes the bisulfide ions into thiosulfate ions. The regenerated scrubbing solution containing reactive chelated metal catalyst and thiosulfate ions are recycled back to the scrubbing vessel for further contact with the hydrogen sulfide containing gas. The thiosulfate ions protect the chelated metal catalyst from degradation.

1 Claim, 1 Drawing Sheet

METHOD FOR CONTINUOUSLY PRODUCING THIOSULFATE IONS

FIELD OF THE INVENTION

This invention relates to an improved process for the conversion of hydrogen sulfide to solid sulfur. The new process of this invention generates thiosulfate, a known redox chelate stabilizer, in situ at a controlled rate thus minimizing catalyst degradation and resulting in improved product sulfur quality and process economics.

BACKGROUND OF THE INVENTION

Hydrogen sulfide is a major source of pollution of gas streams since it is liberated as a waste by-product in a number of chemical processes, such as sulfate or kraft paper pulp manufacture, viscose manufacture, sewage treatment, the production of organic sulfur compounds, as well as during petroleum refining and in the production of natural gas and combustible gases from coal, such as in coking operations. Hydrogen sulfide is also present in geothermal steam, which is captured for use in power generating plants.

To eliminate these polluting sulfur gases the art has developed several oxidationreduction (redox) processes that use an aqueous chelated metal catalyst solution for removing hydrogen sulfide from a gas stream. In those prior art processes a hydrogen sulfide-containing gas, known as "sour gas," is contacted with a chelated metal catalyst to effect absorption and subsequent oxidation of the hydrogen sulfide to elemental sulfur and concurrent reduction of the metal to a lower oxidation state. The catalyst solution is then regenerated for reuse by contacting it with an oxygen-containing gas to oxidize the metal back to a higher oxidation state. The elemental sulfur is continuously removed from the process as a solid product with high purity. Illustrative, but not exclusive, of these oxidation-reduction processes is the description contained in U.S. Pat. No. 4,622,212 (McManus et al.) and the references cited therein, all of which are incorporated herein by reference.

The principal operating problem encountered in such processes utilizing an aminopolycarboxylic acid chelating catalyst is the chemical degradation of the chelating agent, which requires addition of replacement chelating agent. The replacement of the chelating agent may represent a substantial operating cost, which will adversely affect the economic viability of the process.

McManus et al. teach that the degradation of an aminopolycarboxylic acid chelating agent occurs by severance or rupture of nitrogen-carbon bonds during the oxidative regeneration of the catalyst solution and that the degradation of the chelating agent can be retarded by incorporating certain stabilizing agents in the catalyst solution. One of the most effective stabilizing agents is the thiosulfate ion ($S_2O_3^=$).

Thiosulfate ions are made as a byproduct within (in situ) those oxidationreduction processing schemes having the oxidation of hydrogen sulfide and the regeneration of catalyst solution occurring within the same reaction vessel. However, in some oxidation-reduction processing schemes, such as a conventional oxidationreduction processing scheme, the oxidation of hydrogen sulfide occurs in a separate reaction vessel from the regeneration of catalyst solution; consequently, very little, if any, thiosulfate byproduct is produced in this process.

Up until now, the art has failed to come up with a method of producing thiosulfate within those processing schemes utilizing separate vessels for the oxidation and regeneration steps (i.e., in situ). Such a process represents an extremely economical method of reducing catalyst degradation, and consequently, operating costs. In addition, this invention allows for control over the amount of thiosulfate produced within the process. These and other advantages will become evident from the following more detailed description of the invention.

SUMMARY OF THE INVENTION

This invention relates to a method of producing thiosulfate within an oxidationreduction process where the oxidation of hydrogen sulfide and the regeneration of catalyst solution occur in separate reaction vessels (i.e. in situ), thus providing an extremely economical method of reducing catalyst degradation, and consequently, operating costs.

In the process of converting $H_2S$ to elemental sulfur utilizing, for example, a chelated iron catalyst, the $H_2S$ containing gas stream (sour gas) is contacted with the aqueous redox solution where the $H_2S$ is absorbed and converted to elemental sulfur and where a portion of the iron is reduced from the ferric state ($Fe^{+++}$) to the ferrous state ($Fe^{++}$). The solution containing the ferrous state iron is then contacted with an oxygen containing gas, usually air, and the ferrous iron is regenerated back (oxidized) to the ferric state (regeneration step). Sulfur is removed from the system by passing a portion or all of the solution from the oxidizer through a sulfur recovery device, where the sulfur is concentrated and removed from the process. Regenerated metal chelate catalyst solution is returned (recycled) to the process to be used again to catalyze the oxidation of the $H_2S$.

Although a number of polyvalent metals can be used to formulate the metal chelate catalyst used in the process of this invention, a preferred polyvalent metal is iron. The series of reactions involved in catalytically oxidizing hydrogen sulfide to elemental sulfur using an iron chelate catalyst can be represented by the following reactions, where L represents the particular ligand chosen to formulate the metal chelate catalyst:

$$H_2S_{(gas)} + H_2O_{(liq.)} \rightarrow H_2S_{(aqueous)} + H_2O_{(liq.)} \quad (1)$$

$$H_2S_{(aqueous)} \rightarrow H^+ + HS^- \quad (2)$$

$$HS^- + 2(Fe^{3+}L_2) \rightarrow S_{(solid)} + 2(Fe^{2+}L_2) + H^+ \quad (3)$$

By combining equations (1) through (3) the resulting equation is:

$$H_2S_{(gas)} + 2(Fe^{3+}L_2) \rightarrow 2H^+ + 2(Fe^{2+}L_2) + S_{(solid)} \quad (4)$$

In order to have an economical workable process for removing hydrogen sulfide from a gaseous stream when a ferric iron chelate is used to effect catalytic oxidation of the hydrogen sulfide, it is essential that the ferrous iron chelate formed in the above described manner be continuously regenerated by oxidizing to ferric iron chelate on contacting the reaction solution with dissolved oxygen, preferably in the form of ambient air, in the same or in a separate contact zone. The series of reactions which take place when regenerating the metal chelate catalyst can be represented by the following equations:

$$O_{2(gas)} + 2H_2O \rightarrow O_{2(aqueous)} + 2H_2O \quad (5)$$

$$O_{2(aqueous)} + 2H_2O + 4(Fe^{2+}L_2) \rightarrow 4(OH^-) + 4(Fe^{3+}L_2) \quad (6)$$

By combining equations (5) through (6), the resulting equation (7) is:

$$\tfrac{1}{2}O_2 + H_2O + 2(Fe^{2+}L_2) \rightarrow 2(OH^-) + 2(Fe^{3+}L_2) \quad (7)$$

And, when equations (4) and (7) are combined, the overall process can be represented by the following equation:

$$H_2S_{(gas)} + \tfrac{1}{2}O_{2(gas)} \rightarrow S_{(solid)} + H_2O_{(liq.)} \quad (8)$$

It has been found that not all iron chelating agents capable of forming a complex in aqueous solutions with iron in the ferric valence state ($Fe^{3+}$) or in the ferrous valence state ($Fe^{2+}$) are suitable for use over the broad range of operating conditions employed for this oxidation-reduction system for the removal of hydrogen sulfide. Among the iron chelate reagents which have been used in prior art processes for removing hydrogen sulfide are the polyaminopolyacetic acid-type chelating agents, such as ethylenediamine tetraacetic acid and the alkali metal salts thereof.

When oxygen comes in contact with bisulfide ions ($HS^-$) in the presence of iron, side reactions which produce thiosulfate ($S_2O_3^=$) and sulfate ($SO_4^=$) ions occur as follows:

$$H_2S_{(aqueous)} + O_{2(aqueous)} \rightarrow H^+ + \tfrac{1}{2}S_2O_3^= + \tfrac{1}{2}H_2O \quad (9)$$

$$S_2O_3^= + 2\tfrac{1}{2}O_2 \rightarrow 2SO_4^= \quad (10)$$

$$H_2S + O_2 \rightarrow SO_4^= + 2H^+ \quad (11)$$

Although the thiosulfate ions created in the above reactions are beneficial in that they retard the degradation of the chelating agents, the rate at which the thiosulfate is formed presents a serious operational problem. The accumulation of too much thiosulfate within the solution may result in a solution which is saturated with thiosulfate, thus resulting in salt precipitation and pluggage in the system. Consequently, a portion of the solution must be withdrawn (blowndown) from the process on a regular basis to prevent salt precipitation. The chelated iron removed from the process with the blowdown must be replaced from an external source which can represent a substantial operating cost.

In oxidation-reduction processing systems where the oxidation step and regeneration step occur in completely separate vessels, sometimes called conventional systems, the side reactions described above (Equations 9–11) do not occur to any appreciable extent. Consequently, very little thiosulfate ions are formed in these process schemes, and the chelate degradation rate is generally very high. This phenomenon is a result of the relatively long liquid residence times in the absorber which results in almost complete conversion of the hydrosulfide and sulfide ions to elemental sulfur before the solution comes in contact with oxygen. The present invention is intended to eliminate or greatly reduce the problems inherent with having to add thiosulfate from external sources or from not maintaining an appropriate concentration of thiosulfate to stabilize and reduce the rate of chelate degradation.

Accordingly, one object of this invention is to provide a process for continuously producing thiosulfate ions within a processing scheme where the oxidation step and the regeneration steps occur in completely separate vessels.

Another object is to provide a method for optimizing the chemical make-up cost in an iron-based, liquid redox process by controlling the amount of thiosulfate being formed within the process.

The above-stated objects are accomplished by providing a process for continuously producing thiosulfate ions comprising the following steps, in combination: (a) providing a feed stream containing hydrogen sulfide to an oxidation-reduction process; (b) separating the feed stream into a first portion and a second portion; (c) contacting the first portion of the feed stream with an alkaline material to form a stream containing bisulfide ions and a first hydrogen sulfide-fee gas stream; (d) contacting the second portion of the feed gas stream with a chelated metal catalyst to produce a second hydrogen sulfide-fee gas stream and a stream comprising elemental sulfur and chelated metal catalyst solution; (e) contacting the stream containing bisulfide ions with air and the chelated metal catalyst solution to produce thiosulfate ions.

These and other objects will become more apparent from the detail description of the preferred embodiment contained below.

DETAILED DESCRIPTION OF PREFERRED EMBODIMENTS

The invention thus far has been described with particular emphasis on the use of iron as the polyvalent metal of choice; however, other polyvalent metals that form chelates with the ligands described above can also be used. Such additional polyvalent metals include copper, cobalt, vanadium, manganese, platinum, tungsten, nickel, mercury, tin and lead.

The chelating agents which are generally of the aminopolycarboxylic acid family such as EDTA, HEDTA and NTA, any one of which can be used in connection with this invention.

In all liquid oxidation-reduction systems, some form of alkaline material must be added to the system to control the pH of the solution. Without the addition of the alkaline material, the pH of the solution will slowly decrease until absorption of $H_2S$ into the solution is no longer great enough to meet the required $H_2S$ removal efficiencies. This decrease in pH is due to the acidic nature of $H_2S$. In addition, if the gas stream being processed contains other acidic species such as carbon dioxide, the pH will decrease even more quickly than with just $H_2S$. Consequently, alkaline materials such as NaOH, KOH, ammonia, alkali metal carbonates, or bicarbonates are generally added to the system on a continuous basis to neutralize the acidic components. These materials are generally added to the bulk solution contained in the oxidizer; however, they can be added anywhere in the process.

Figure 1:
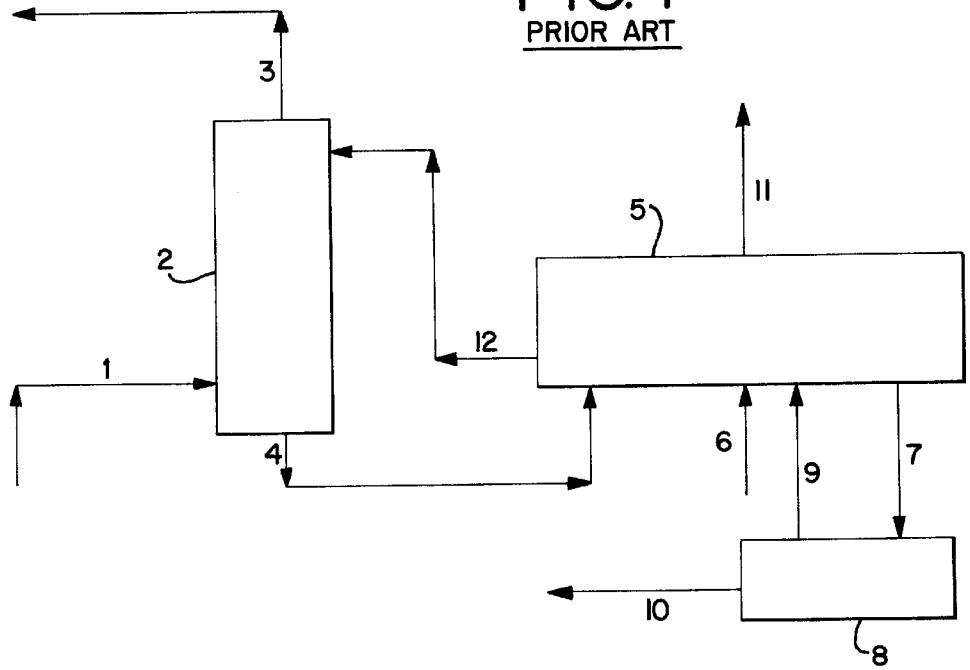
FIG. 1 schematically illustrates the process flow scheme for a prior art conventional hydrogen sulfide oxidation-reduction process synthesis scheme.

FIG. 1 of the drawings illustrates a standard prior art conventional processing scheme for treatment of gas streams contaminated with $H_2S$. As shown, a waste gas stream (sour gas) is delivered via a feed line 1 to an absorber 2 where it is contacted with an aqueous chelated iron catalyst solution. This solution is obtained from oxidizer 5. The absorber 2 may be of any suitable design to meet the required amount of $H_2S$ removal, i.e. liquid full absorbers, static mixers, packed columns, venturis or mobile bed absorbers. A hydrogen sulfide-free gas stream leaves the absorber 2 via line 3. An admixture stream comprising elemental sulfur and chelated metal catalyst solution leaves the absorber 2 via line 4 and enters the oxidizer 5. An $O_2$ containing gas stream, preferably air, is introduced into the oxidizer 5 via line 6. The elemental sulfur is continuously removed from the process by sending a portion of the liquid solution contained in the oxidizer 5, designated as stream 7, to a sulfur recovery device 8. All or a portion of the aqueous catalyst solution is returned to the oxidizer 5 via line 9, while the recovered sulfur 10 is either sold or sent to disposal. Oxidation of the ferrous chelate to the ferric chelate occurs in the oxidizer 5, which is accomplished by supplying $O_2$ containing gas stream via line 6 to the oxidizer. Excess gas from the oxidizer is removed from the process via stream 11. The regenerated chelated iron catalyst solution is returned to the absorber via line 12.

In an embodiment of the invention described herein (FIG. 2), the alkaline material 13 is injected into a bisulfide generator 14 into which a sidestream of the sour gas 15 is routed. Within the bisulfide generator 14, the sour gas stream is contacted with the caustic alkaline solution, and the $H_2S$ in the sour gas stream is absorbed into the caustic alkaline solution (KOH as an example). This contact creates bisulfide ions ($HS^-$), according to the following reaction:

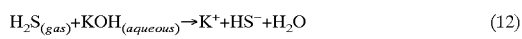

$$H_2S_{(gas)} + KOH_{(aqueous)} \rightarrow K^+ + HS^- + H_2O \quad (12)$$

The treated gas 16, which will be free of $H_2S$, exits the bisulfide generator 14 and is combined with the treated gas 3 from the absorber 2, while the sour liquid caustic stream 17 containing bisulfide ions ($HS^-$) is directed into the oxidizer 5. Within the oxidizer 5, the bisulfide ions in the caustic stream react, in the presence of chelated iron, with the dissolved oxygen in the oxidizer solution to form thiosulfate ions, according to the following reaction:

$$2HS^- + 2O_2 \rightarrow S_2O_3^- + H_2O \quad (13)$$

Without the presence of the chelated iron, the bisulfide ions will not be efficiently oxidized to thiosulfate. However in the presence of chelated iron, thiosulfate yields approaching 80% have been achieved. In this processing scheme, it is essential that the sour caustic stream 17 be directed into the oxidizer 5 where the solution is aerated. In addition, it is essential that chelated iron be present to catalyze the thiosulfate producing reaction.

The bisulfide generator 14 may be any device or combination of devices, which results in intimate contact between the caustic solution and the sour gas stream 15 followed by separation of the gas and liquid streams. Examples include countercurrent, packed column absorbers, spray chambers, static mixers, etc.

The total amount of $H_2S$ entering the system, which is converted to thiosulfate can be adjusted by simply varying the amount of sour gas 15 which is diverted to the bisulfide generator 14. By routine analysis of the oxidizer solution, the concentration of thiosulfate is determined. A thiosulfate concentration of 1–20%, preferably 5–10%, should be maintained in the oxidizer. If analysis shows that a higher concentration of thiosulfate is needed, then additional sour gas is diverted to the bisulfide generator. Conversely, if analysis shows that a lower concentration of thiosulfate is needed, the sour gas flow to the bisulfide generator is reduced.

The amount of alkaline material to be added to the bisulfide generator may be calculated by using the flow rate of sour gas to the bisulfide generator, the $H_2S$ concentration of that sour gas and then applying the stoichiometry of the bisulfide generation reaction (12), given above. Since it is desired to assure that all of the $H_2S$ sent to the bisulfide generator is reacted, a suitable excess, preferably 5–10%, of alkali material is desired.

This embodiment of the invention may be conducted at any pressure and between 40–140° F.

EXAMPLE

Figure 2:
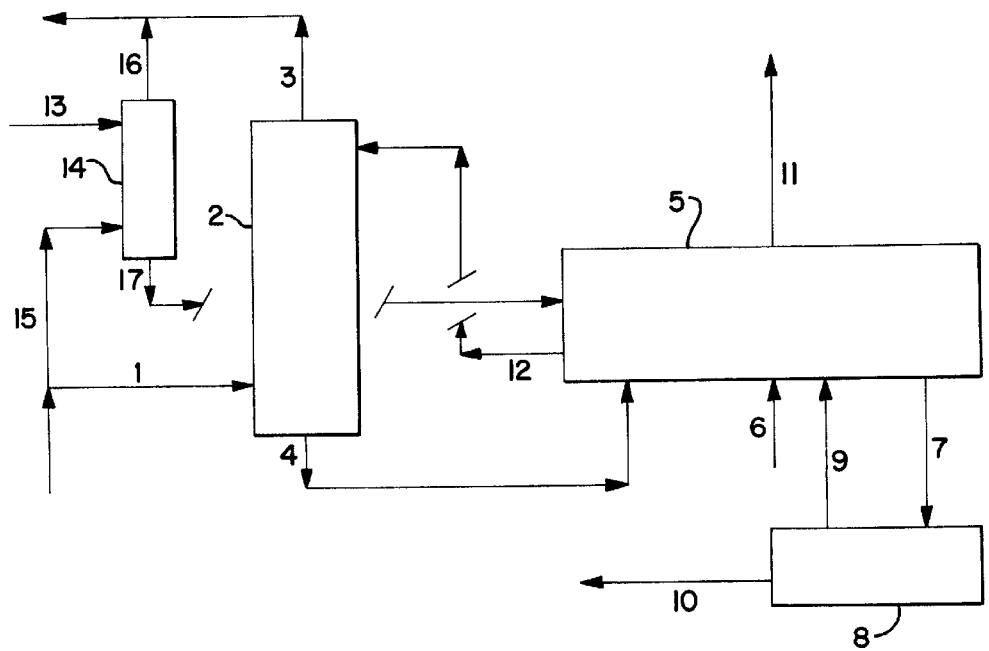
FIG. 2 schematically illustrates the process flow scheme for one embodiment of this invention.

Referring to FIG. 2, assume a natural gas processing facility needs to treat 10 million standard cubic feet per day of natural gas, which contains 0.8 vol. % $H_2S$. In the treating process the $H_2S$ must be reduced to 4 ppm. This treating requirement represents the production of approximately 3 long tons per day (LTPD) of sulfur. It is desired to employ an iron-based, liquid redox system for removal of the $H_2S$ and to maintain 8 wt % $K_2S_2O_3$ in the circulating, chelated iron catalyst solution. In addition, the sulfur recovery unit 8 will produce a 60 wt % sulfur cake 10 in which the moisture portion will consist of 50 wt % wash water and 50 wt % chelated iron catalyst solution.

From the above, the sulfur cake 10 will consist of 6720 lbs/day of sulfur and 4480 lbs/day of moisture (50 wt % wash water & 50 wt % redox solution); consequently, since the iron chelate catalyst solution is 8 wt % $K_2S_2O_3$, 179.2 lbs/day of $K_2S_2O_3$ will be lost from the system. To replace this loss, a portion of the sour natural gas will be diverted to the bisulfide generator 14. Assuming that 100% of the $H_2S$ contained in stream 15 will be converted to thiosulfate, 68,363.5 SCFD of natural gas will need to be treated in the bisulfide generator 14 with 105.6 lbs/day of KOH 13 to produce the required amount of thiosulfate (179.2 lbs/day of $K_2S_2O_3$).

What is claimed is:

1. A process for continuously producing thiosulfate ions within an oxidizer vessel in an oxidation-reduction process comprising the following steps, in combination:

a) providing a gaseous feed stream containing hydrogen sulfide;

b) separating the gaseous feed stream into a first portion and a second portion;

c) directing the first portion of the feed stream to a bisulfide generator vessel;

d) mixing the first portion of the feed stream with an alkaline solution within the bisulfide generator, to chemically form bisulfide ions and a first hydrogen sulfide-free gas;

e) removing an aqueous solution containing the bisulfide ions from the bisulfide generator and directing it to an oxidizer vessel;

f) removing the hydrogen sulfide-free gas from the bisulfide generator;

g) directing the second portion of the gaseous feed stream to an absorber vessel where it is mixed with a solution of chelated metal catalyst to produce a second hydrogen sulfide-free gas stream and an aqueous stream comprising elemental sulfur and chelated metal catalyst solution;

h) removing the second hydrogen sulfide free gas stream from the absorber;

i) removing the aqueous stream comprising elemental sulfur and chelated metal catalyst from the absorber and directing it to the oxidizer where it is mixed with air in the presence of the bisulfide ions from the bisulfide generator to chemically produce thiosulfate ions; and j) monitoring the concentration of thiosulfate ions in the oxidizer and adjusting the thiosulfate ion concentration by increasing or decreasing the volume of the first portion of feed stream directed to the bisulfide generator.

* * * * *